Inventors
Marshall Long
Lewis F. Alley
By
Attorney

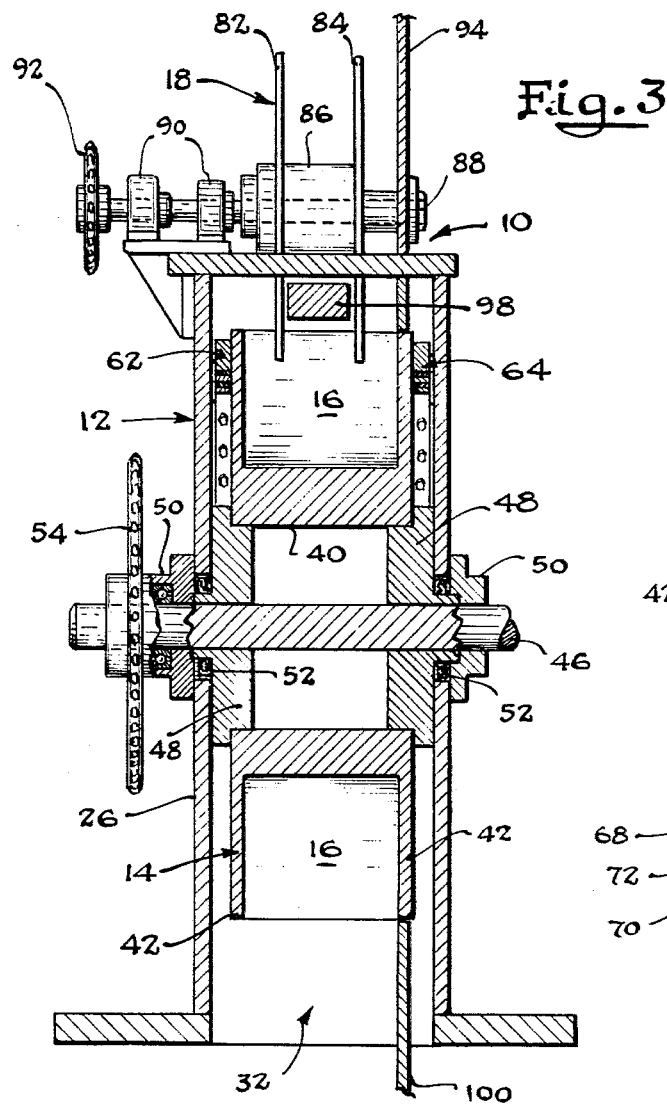
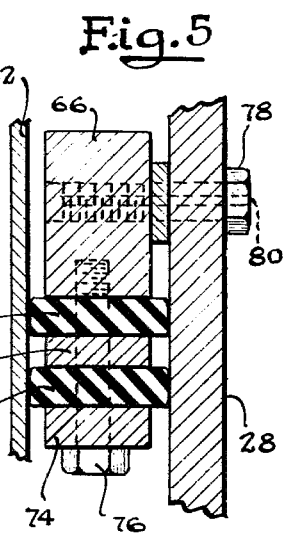
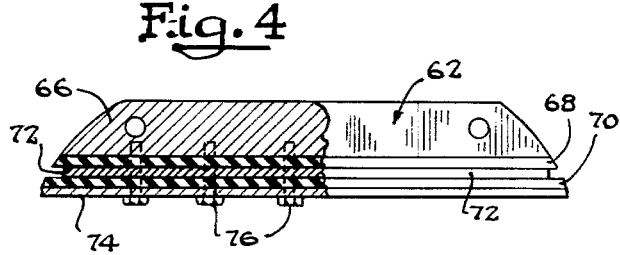

United States Patent Office 3,250,406
Patented May 10, 1966

3,250,406
ARTICLE LOCK APPARATUS
Marshall Long, Overland Park, Kans., and Lewis Frank Alley, Kansas City, Mo., assignors to Swift & Company, Chicago, Ill., a corporation of Illinois
Filed Dec. 30, 1963, Ser. No. 334,196
7 Claims. (Cl. 214—17)

The present invention relates to an article lock for transferring objects from one environment into another environment. More specifically, the present invention relates to an improved apparatus for conveying containers, such as cans, through a wall or the like between relatively high pressure and low pressure zones.

It is sometimes necessary in manufacturing processes to transport items from one processing environment to another in a manner which prevents intermingling of the two dissimilar environments, or at least in a manner which minimizes such intermingling. Examples of such dissimilar environments are liquid and gas, lighted and unlighted, hot and cold, high pressure and low pressure, and numerous other controlled atmospheres. Generally, apparatus for this purpose are referred to as article lock mechanisms and are analogous in function and purpose to boat locks which transfer watercraft from water at one elevation to another.

A specific problem leading to the embodiment of the present invention disclosed herein concerns the transfer of containers, such as cans or glass jars and the like, of various sizes, in both directions between the interior of an enclosed chamber held at high pressure and the exterior of such chamber subjected to normal atmospheric pressure without excessive loss of high pressure air from the chamber. The chamber is utilized in a canning process wherein food products are sterilized at high temperature and pressure and filled into cans in an ambient atmosphere of about 18 p.s.i.g. Accordingly, it is the principal object of the present invention to provide an improved article lock mechanism which keeps the movement of one environment into the other at a minimum.

It is another object of the present invention to provide a container lock apparatus for use in transferring containers between zones at relatively high and low pressures which efficiently seals said zones from one another.

It is a further object of the present invention to provide an improved article lock mechanism which is adaptable to handling a range of article sizes.

Basically the apparatus of the present invention comprises an article valve, including a turret within a housing, and a delivery means for feeding articles to pockets about the periphery of the turret, wherein improved seals are provided within the valve between the turret and its housing to prevent the egress of one environment into the other through the housing, and wherein the pockets of the turret may be adapted in size to closely conform to the articles to be carried therein.

Further objects and advantages of the present invention will become apparent upon reading the following description in conjunction with the drawings wherein:

FIGURE 3 is a side view of the apparatus partially in section taken at line 3—3 in FIGURE 1;

FIGURE 4 is a plan view of a seal apart from the apparatus shown in the preceding figures; and FIGURE 5 is an enlarged end view of the seal shown in FIGURE 4 shown mounted to a portion of the apparatus of FIGURE 3.

Figure 1:
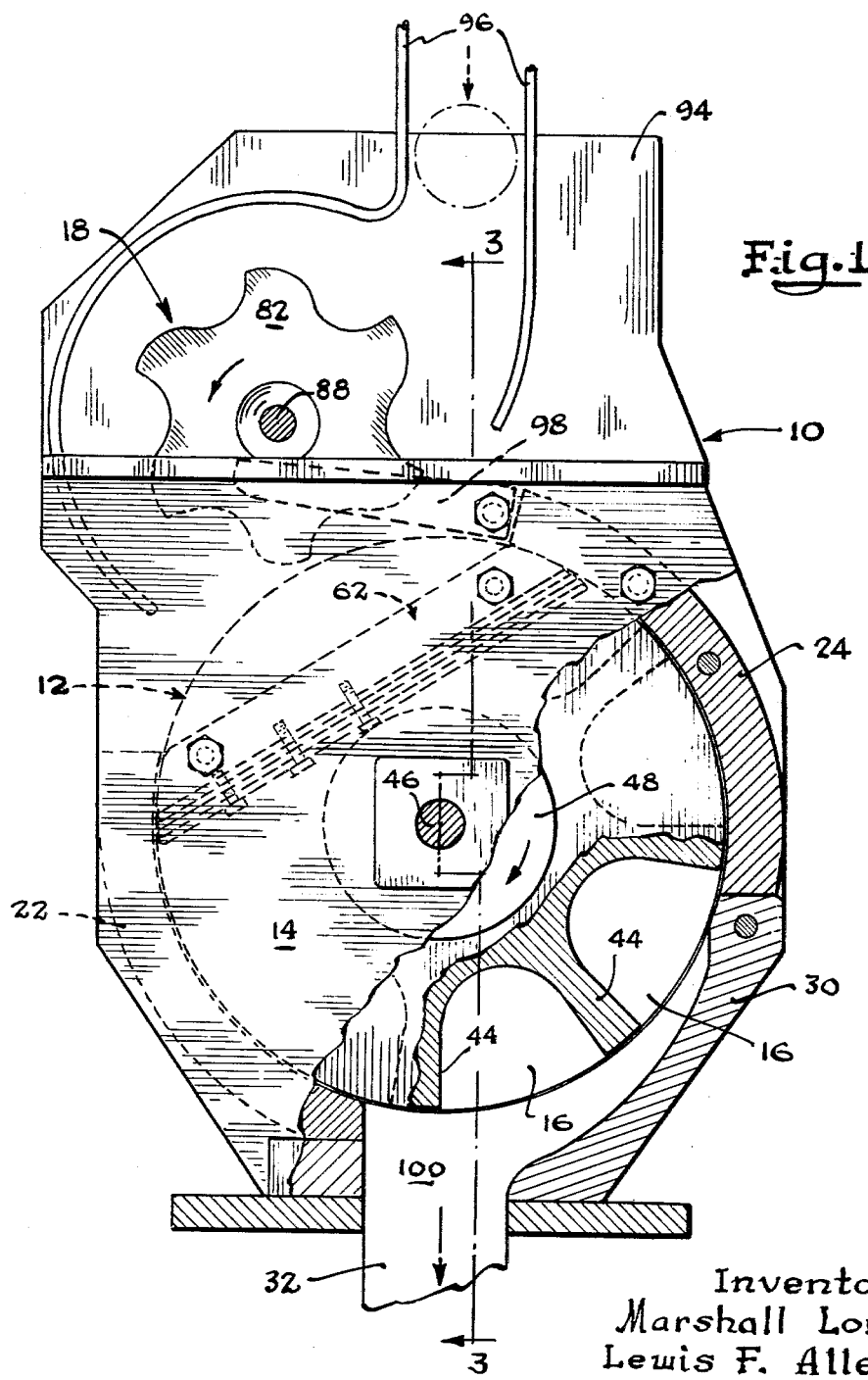
FIGURE 1 is an overall plan view, with parts removed, of the apparatus of the present invention adapted to reside within a zone of lower pressure and transfer articles to a zone of higher pressure.

As may be seen in the figures, the preferred embodiment of the present apparatus comprises an article lock assembly generally 10 comprising a valve generally 12, which basically includes a rotatable turret 14 having a plurality of peripheral pockets 16, to which articles such as cans are fed by a star wheel generally 18.

With respect to the valve generally 12, the turret 14 is rotatably located within a housing comprised of a pair of heavy arcuate sealing shoes 22, 24, at the left and right side respectively in FIGURE 1, and a pair of side plates or covers 26, 28, which are visible in FIGURE 3. Both of the sealing shoes 22, 24 conform to the outer periphery of the turret 14 and are in sliding contact therewith. Preferably, both sealing shoes are constructed of bronze. Sealing shoe 24, to the right in FIGURE 1, is connected to a separate member constituting an exit shoe 30 which gradually curves away from the periphery of turret 14 at the lower portion shown in the figure to form an exit opening 32 between it and the opposite sealing shoe 22. The latter opening extends through a mounting plate 34, which is preferably normal to the plane in which turret 14 rotates, and which may be secured to a chamber or building wall or the like. The upper ends of the sealing shoes 22, 24, as seen in FIGURE 1, are spaced apart so as to form an open entrance end opposite the exit opening 32.

The turret 14 is comprised of an annular rim 40 having side walls 42 and radial vanes 44 which form a plurality of pockets 16 which are completely enclosed except along the peripheral face of the turret which slides against the inner surfaces of shoes 22, 24. The annular rim 40 of turret 14 is secured to a shaft 46 by hubs 48. The shaft 46 is in turn supported in bearings 50 for rotation within the housing. Hub seals 52 embrace the shaft 46 at the side plates 26, 28 to prevent egress of internal air at those locations. Also mounted upon the shaft 46 is a drive gear 54 through which the turret is rotated by a suitable drive chain or the like, not shown.

The turret pockets 16 are preferably of a size large enough to accept the largest container in a series expected to be handled by the apparatus. However, according to the present invention and as illustrated only in the embodiment of FIGURE 2, pockets 16' may be readily adapted to handle containers of smaller sizes by means of an arcuate insert 58 which may be fixed to the vane surfaces forming the interior of each pocket 16' by means of set screws or the like, not shown. The inserts 58 may be readily fabricated from either plastic or malleable metal, such as aluminum.

Figure 2:
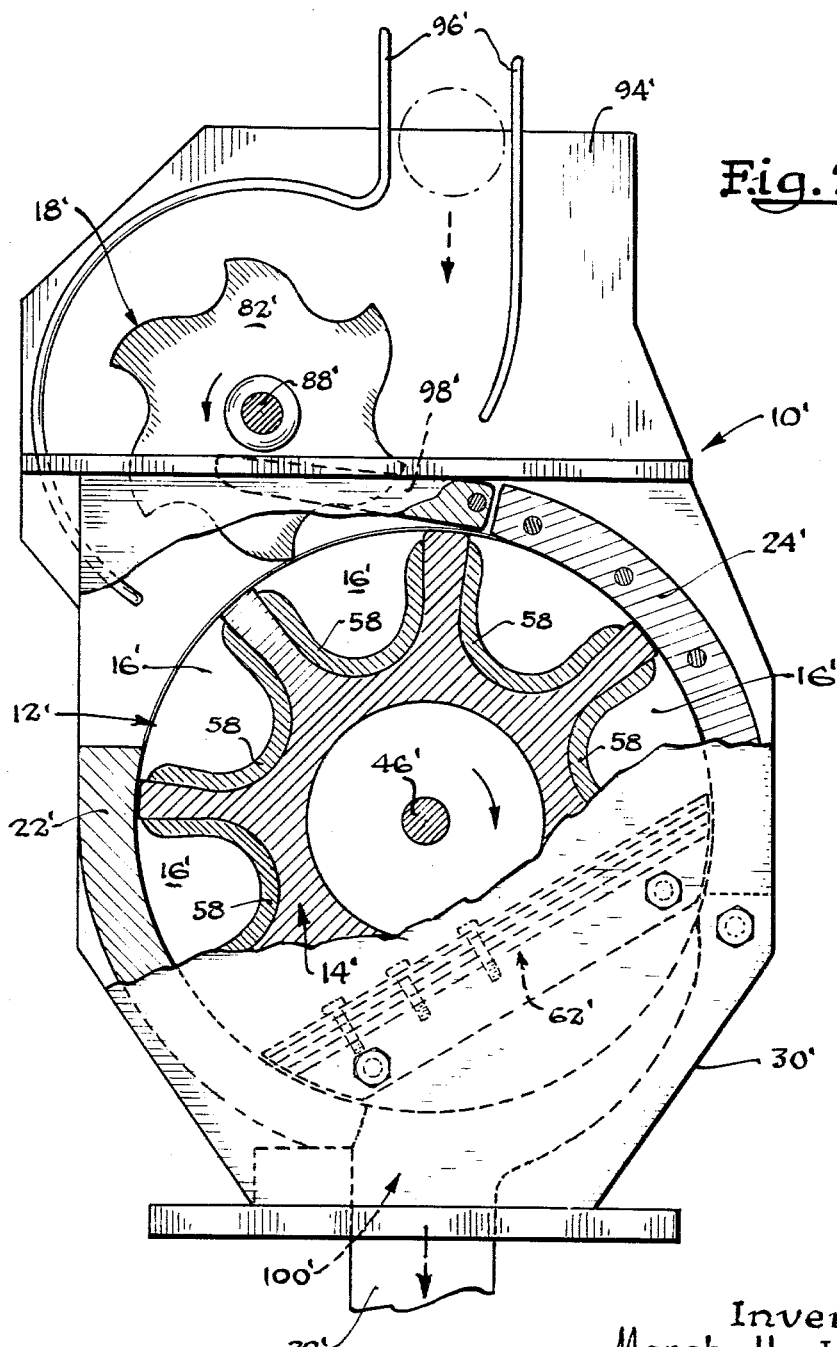
FIGURE 2 is an overall plan view, with parts removed, of an apparatus similar to FIGURE 1, adapted to reside in a zone of high pressure and transfer articles to a zone of relatively low pressure, and also adapted for handling smaller containers.

A particularly significant feature of the present invention is a pair of deformable sealing bars 62, 64 mounted within the housing, chord-like between shoes 22, 24 on the side plates 26, 28 as shown in FIGURES 1, 2 and 3. Sealing bars 62, 64 are located, as will hereinafter be explained, to prevent, or reduce, the egress of high pressure air through the valve generally 12 to a minimum acceptable amount. Each sealing bar extends fully between the two sealing shoes 22, 24 at one side of the turret shaft 46 beyond the hub 40. It is preferred that the sealing bars 62, 64 be located at the side of shaft 46 which is opposite the source of high pressure air. That is, the majority of the volume within the housing will be exposed to high pressure air.

As may be best seen in FIGURES 4 and 5, each sealing bar comprises a laminate structure of alternated rigid and compressible elements. The preferred form includes five separate coextensive elements as follows: a relatively broad base stock 66, a pair of compressible strips 68, 70, made of rubber or the like, a rigid metal strip 72 positioned between the compressible strips, and a rigid cap strip 74. Each of the five elements extends the full distance between the sealing shoes 26, 28 and the ends thereof are shaped to, together, form a curve congruent with the sealing shoes. The elements of the sealing bars are held together without substantial compression by a plurality of smooth shank bolts 76 threaded only into the base stock 66. In turn, each sealing bar assembly 62, 64 is secured to the respective side plates 26, 28 by a plurality of studs 78 threaded into the base stock portions 66. Preferably the studs 78 have a small diameter longitudinal passage 80 extending therethrough by means of which lubricant may be delivered to the turret 14. Also it is advantageous to employ spacers between the base stock 66 and housing side plate to center the sealing bars between the turret and housing.

The sealing bar assemblies 62, 64 are mounted with the cap strips 74 directed toward the source of high pressure air. Accordingly, the pressure within the housing will tend to compress and deform the rubber strips 68, 70 so as to force them outwardly of the rigid members 66 and 72. Thus, the compressible strips 68, 70 expand between the side plates 26, 28 and the rims 42 of the turret 14 so as to effectively seal the space and prevent egress of high pressure air. When one edge of the compressible strips become worn by the turret, the sealing bars 62, 64 may be reversed for extended useful life.

As stated, it is preferred that the major volume within the housing be maintained under the higher pressure environment. Therefore, where the valve generally 12 is mounted outside of the high pressure chamber, so as to transfer articles thereinto, the sealing bars 62, 64 are mounted near the entrance end of the housing per the embodiment shown in FIGURE 1; whereas if the valve 12 is mounted within the high pressure chamber to transfer articles therefrom the sealing bars 62', 64' are mounted nearer the exit opening 32' per the embodiment shown in FIGURE 2 wherein elements correspondnig to those above described are identified with like reference characters being prime exponents.

Referring to the star wheel generally 18, the latter is preferably comprised of a pair of star shaped plates 82, 84 which are congruently fixed to opposite ends of a sleeve 86, which in turn is secured on a shaft 88. The shaft 88 in turn is mounted for rotation in bearings 90 and bears a drive gear 92 by which the star wheel may be rotated through a suitable timed drive chain or the like, not shown. As may be seen in FIGURE 3, the star wheel generally 18 is positioned to rotate in a plane parallel to a delivery slide plate 94 across which cans or the like slide between a pair of can guides 96. Also, the two shaped plates 82, 84, forming the star wheel generally 18, are spaced apart a sufficient distance so as to positively contact opposite ends of each can and move the latter without tending to tip the can. The space between the star wheel plates 82, 84 is also sufficient to receive a free end of an extractor finger 98 which may be seen in FIGURES 1 and 2 extending from the top of sealing shoe 24 to the star wheel 18. The extractor finger 98 positively discharges cans from the star wheel 18 and into a pocket 16 of the valve turret 14.

Normally, the structure of the lock mechanism generally 10 is mounted so that cans will drop from the pocket 16 through the exit opening 32 under the influence of gravity. Where the apparatus is so mounted, it is merely necessary to provide an exit plate 100, visible in FIGURE 3, across which the cans may slide upon leaving the turret 14. However, where the apparatus must be mounted in another attitude, it is within the knowledge of the art to provide a suitable mechanical expulsion device.

Obviously many modifications and variations of the invention as hereinbefore set forth may be made without departing from the spirit and scope thereof, and therefore only such limitaitions should be imposed as are indicated in the appended claims.

We claim:

1. An improved article lock apparatus comprising: a housing having open entrance and exit portions adapted to be located in different environments, said housing including arcuate peripheral walls between said entrance and exit portions and flat side plates; a circular turret rotatably mounted to said side plates within said housing in sliding contact with said peripheral walls, said turret having side walls parallel and spaced from said side plates and a plurality of pockets between said side walls for transporting articles from said entrance to said exit portions; and a pair of sealing bars secured within said housing chord-like to said peripheral walls and between said side plates and the side walls of said turret to prevent the egress of one environment into the other through said housing.

2. An improved article lock apparatus comprising: a housing having open entrance and exit portions adapted to be located in first and second pressure enviromments, said housing including arcuate peripheral walls between said entrance and exit portions and flat side plates; a circular turret rotatably mounted to said side plates within said housing in sliding contact with said peripheral walls, said turret having side walls parallel and spaced from said side plates and a plurality of pockets between said side walls for transporting articles from said entrance to said exit portions; and a pair of pressure deformable sealing bars secured within said housing chord-like to said peripheral walls and between said side plates and the side walls of said turret adjacent the one of said entrance and exit portions at the lower of said first and second pressure environments to prevent the egress of one environment into the other through said housing.

3. The apparatus of claim 1 wherein a feeding means is located adjacent said entrance portions of said housing to deliver article to said pockets of said turret.

4. The apparatus of claim 2 wherein a feeding means is located adjacent said entrance portion of said housing to deliver articles to said pockets of said turret.

5. The apparatus of claim 1 including arcuate inserts mounted within said pockets of said turret to adapt said pockets to transport articles of lesser dimension.

6. The apparatus of claim 2 wherein said sealing bars comprise a laminate structure of alternate rigid and compressible members mounted on a rigid base and disposed within said housing with said rigid base facing the lower pressure environment whereby the higher pressure will compress and deform said compressible members to force the latter outwardly into contact with said housing side plates and said turret side walls.

7. The apparatus of claim 2 wherein said sealing bars comprise: a base member adapted to be secured between said housing and said turret with a face of said base member directed toward said high pressure; at least one compressible member co-extensive with said base member and held against said face; a rigid cap member surmounting said compressible member opposite said base member; and a plurality of bolts securing all of said aforementioned members together in a non-compressed condition whereby the high pressure environment will compress and deform said compressible member outwardly of said base member against said housing and said turret.

References Cited by the Examiner
UNITED STATES PATENTS

| | | | |
|---|---|---|---|
| 1,676,432 | 7/1928 | Dieterich | 277—233 |
| 2,468,794 | 5/1949 | Wilbur | 214—17.4 |
| 2,492,460 | 12/1949 | Botelho | 214—17.4 |
| 2,951,721 | 9/1960 | Asp | 277—233 |

GERALD M. FORLENZA, *Primary Examiner.*

HUGO O. SCHULZ, *Examiner.*